(12) United States Patent
Sun et al.

(10) Patent No.: US 10,767,733 B2
(45) Date of Patent: Sep. 8, 2020

(54) PIN TOOTH CYCLOID REDUCER AND INDUSTRIAL ROBOT

(71) Applicant: KUNSHAN QUANTA MACHINERY CO., LTD., Jiangsu (CN)

(72) Inventors: Zijian Sun, Jiangsu (CN); Meizhu Zheng, Jiangsu (CN); Xueyun Peng, Jiangsu (CN)

(73) Assignee: Kunshan Quanta Machinery Co., Ltd., Kunshan, Jiangsu (CN)

( * ) Notice: Subject to any disclaimer, the term of this patent is extended or adjusted under 35 U.S.C. 154(b) by 231 days.

(21) Appl. No.: 16/079,695

(22) PCT Filed: May 12, 2017

(86) PCT No.: PCT/CN2017/084063
§ 371 (c)(1),
(2) Date: Aug. 24, 2018

(87) PCT Pub. No.: WO2018/205242
PCT Pub. Date: Nov. 15, 2018

(65) Prior Publication Data
US 2020/0240492 A1    Jul. 30, 2020

(51) Int. Cl.
*F16H 1/32* (2006.01)
*B25J 9/10* (2006.01)
*F16H 1/34* (2006.01)

(52) U.S. Cl.
CPC ............... *F16H 1/32* (2013.01); *B25J 9/102* (2013.01); *F16H 1/34* (2013.01); *F16H 2001/323* (2013.01)

(58) Field of Classification Search
None
See application file for complete search history.

(56) References Cited

U.S. PATENT DOCUMENTS

| 627,382 A | * | 6/1899 | Birrell | F16H 3/70 |
| | | | | 475/173 |
| 724,663 A | * | 4/1903 | Clennam | F16H 1/32 |
| | | | | 475/1 |

(Continued)

FOREIGN PATENT DOCUMENTS

| CN | 101660588 A | 3/2010 |
| CN | 104100680 A | 10/2014 |

(Continued)

OTHER PUBLICATIONS

International Search Report and Written Opinion (in Chinese language), issued by The State Intellectual Property Office of People's Republic of China, dated Jan. 25, 2018 for International Application No. PCT/CN2017/084063; 11 pages.

(Continued)

*Primary Examiner* — Dirk Wright
(74) *Attorney, Agent, or Firm* — Faegre Drinker Biddle & Reath LLP

(57) ABSTRACT

A pin tooth cycloid reducer and an industrial robot are provided. The pin tooth cycloid reducer includes: a first cycloid structure system and a second cycloid structure system, disposed in an axial direction, wherein the first cycloid structure system is sleeved on an eccentric shaft, and each cycloid structure system comprises at least one cycloid structure in the axial direction; where the cycloid structure includes: a cycloid disk, a plurality of pin teeth distributed circumferentially and a pin tooth housing, successively disposed from inside to outside in a radial direction; wherein the plurality of pin teeth are rotatably fixed to the pin tooth housing, and the cycloid disk engages with the plurality of pin teeth; wherein all pin tooth housings in the pin tooth cycloid reducer are coaxially disposed. Therefore, deceleration can be achieved.

29 Claims, 7 Drawing Sheets

(56) References Cited

U.S. PATENT DOCUMENTS

| | | | | |
|---|---|---|---|---|
| 1,192,627 | A * | 7/1916 | Hatlee | F16H 1/32 475/176 |
| 2,108,384 | A * | 2/1938 | Moisy | F16H 1/32 475/175 |
| 2,250,259 | A * | 7/1941 | Foote, Jr. | F16H 1/32 475/177 |
| 3,413,896 | A * | 12/1968 | Wildhaber | F16H 1/32 92/57 |
| 3,783,712 | A * | 1/1974 | Colinet | F16H 1/32 475/168 |
| 3,955,445 | A * | 5/1976 | Osterwalder | F16H 1/32 475/176 |
| 4,014,224 | A * | 3/1977 | Pitts | F16H 1/32 475/176 |
| 4,023,440 | A * | 5/1977 | Kennington | F16H 1/32 475/159 |
| 4,023,441 | A * | 5/1977 | Osterwalder | F16H 1/32 475/176 |
| 4,228,698 | A * | 10/1980 | Winiasz | F16H 1/32 475/178 |
| 4,271,726 | A * | 6/1981 | Ryffel | F16H 1/32 418/61.3 |
| 4,338,831 | A * | 7/1982 | Rodaway | F16H 1/32 475/178 |
| 4,386,540 | A * | 6/1983 | Skaggs, Jr. | F16H 1/32 475/176 |
| 4,554,846 | A * | 11/1985 | Distin, Jr. | F16H 25/06 475/168 |
| 4,604,916 | A * | 8/1986 | Distin, Jr. | F16H 1/32 475/168 |
| 4,621,543 | A * | 11/1986 | Gabilondo | F16H 1/32 475/168 |
| 4,643,047 | A * | 2/1987 | Distin | F16H 25/06 475/168 |
| 4,658,675 | A * | 4/1987 | Murray | F16H 1/32 475/168 |
| 4,679,465 | A * | 7/1987 | Goto | F16H 1/32 475/180 |
| 4,838,741 | A * | 6/1989 | Dumoulin | F16H 1/32 409/131 |
| 4,896,567 | A * | 1/1990 | Zhou | F16H 1/32 475/170 |
| 8,517,878 | B2 * | 8/2013 | Nagumo | F16H 1/32 475/163 |
| 8,827,855 | B2 * | 9/2014 | Kullin | F16H 1/32 475/176 |
| 8,979,697 | B2 * | 3/2015 | Lin | F16H 1/32 475/162 |
| 9,097,318 | B2 | 8/2015 | Xu et al. | |
| 9,469,334 | B2 * | 10/2016 | Ko | B62D 5/0403 |
| 10,174,811 | B2 * | 1/2019 | Lee | F16H 1/32 |
| 10,610,429 | B2 * | 4/2020 | Heneveld, Jr. | F16D 11/14 |
| 2005/0054470 | A1 * | 3/2005 | Choun | F16H 1/32 475/163 |

FOREIGN PATENT DOCUMENTS

| | | |
|---|---|---|
| CN | 104565217 A | 4/2015 |
| JP | S60241549 A | 11/1985 |
| JP | 2001132803 A | 5/2001 |
| SU | 1670271 A1 | 8/1991 |
| SU | 1670271 A1 | 8/1991 |

OTHER PUBLICATIONS

Japanese Office Action for JP2018-549536A, Japanese Intellectual Property Office, dated Sep. 3, 2019, 10 pages.
Korean Office Action for KR10-2018-7025597, Korean Intellectual Property Office, dated Oct. 16, 2019, 23 pages.
English translation of International Search Report issued by The State Intellectual Property Office of People's Republic of China, for International Application No. PCT/CN2017/084063, dated Jan. 25, 2018, 2 pages.

* cited by examiner

PIN TOOTH CYCLOID REDUCER AND INDUSTRIAL ROBOT

CROSS-REFERENCE TO RELATED APPLICATIONS

This application is the National Phase of International Application No. PCT/CN2017/084063, filed on May 12, 2017, and entitled "PIN TOOTH CYCLOID REDUCER AND INDUSTRIAL ROBOT", the entire disclosure of which is incorporated herein by reference.

TECHNICAL FIELD

The present disclosure generally relates to a reducer technology field, and more particularly, to a pin tooth cycloid reducer and an industrial robot.

BACKGROUND

Industrial robots are machines that can accomplish various movements or processes instead of human labor during a production process. Industrial robots have an actuator and a power source which drives the actuator to perform various actions. Usually, a reducer is disposed between the power source and the actuator, to reduce the speed and increase the torque by outputting high-speed power from a motor or an internal combustion engine and so on, to the actuator.

At present, the RV type reducer (the pin tooth cycloid reducer) produced by NABTESCO of Japan has become the most widely used type of reducer in industrial robots due to its compact structure and strong transmission capability. The RV type reducer generally includes a pin tooth housing, a cycloid disk capable of cycloid motion in the pin tooth housing, and a plurality of pin teeth disposed between the pin tooth housing and the cycloid disk. The cycloid disk performs a cycloid motion in the pin tooth housing to achieve deceleration. The RV type decelerator also includes a planet carrier. The planet carrier is connected to the cycloid disk via an eccentric shaft, so that the cycloid motion of the cycloid disk is transmitted to the planet carrier and a rotation is generated to the planet carrier to output power.

Studies show that the RV type reducer has relatively more components and complex structures, and the manufacturing precision between the components is extremely high, resulting in a low yield rate. In addition, surveys show that the RV type reducer is easily damaged during use, especially the eccentric shaft which is disposed between the planet carrier and the cycloid disk, and are easily wom or damaged due to stress concentration.

Therefore, a new cycloid reducer without a planet carrier for output is needed, which has a relatively simple structure and is easy to manufacture, and due to the absence of a planet carrier, the relative parts of which is not easily damaged in the process of use.

SUMMARY

A new pin tooth cycloid reducer is provided according to embodiments of the present disclosure, so that it is easy to manufacture and not easily damaged.

A pin tooth cycloid reducer is provided, including: a first cycloid structure system and a second cycloid structure system, disposed in an axial direction, wherein the first cycloid structure system is sleeved on an eccentric shaft, and each cycloid structure system includes at least one cycloid structure in the axial direction; wherein the cycloid structure includes: a cycloid disk, a plurality of pin teeth distributed circumferentially and a pin tooth housing, successively disposed from inside to outside in a radial direction; wherein the plurality of pin teeth are rotatably fixed to the pin tooth housing, and the cycloid disk engages with the plurality of pin teeth; wherein all pin tooth housings in the pin tooth cycloid reducer are coaxially disposed; wherein at least one cycloid disk in the second cycloid structure system and at least one cycloid disk in the first cycloid structure system are circumferentially fixed, and circumferentially fixed cycloid disks are coaxially disposed; when the eccentric shaft rotates, the cycloid disk in the first cycloid structure system rotates at a first angle $\alpha$ relative to the corresponding pin tooth housing, and the cycloid disk in the second cycloid structure system rotates at a second angle $\beta$ relative to the corresponding pin tooth housing, where the first angle $\alpha$ does not equal to the second angle $\beta$.

In some embodiment, the second cycloid structure system is sleeved on the eccentric shaft.

In some embodiment, in the first cycloid structure system, there is disposed one cycloid structure; and in the second cycloid structure system, there is disposed one cycloid structure.

In some embodiment, both the first cycloid structure system and the second cycloid structure system include at least two cycloid structures disposed in sequence in the axial direction; and a number of the at least one cycloid disk in the first cycloid structure system and a number of the at least one cycloid disk in the second cycloid structure system are equal, and the at least one cycloid disk in the first cycloid structure system and the at least one cycloid disk in the second cycloid structure system are fixedly connected in a one-to-one correspondence in a circumferential direction.

In some embodiment, in the first cycloid structure system and the second cycloid structure system, two cycloid disks having the shortest distance therebetween in the axial direction are fixed circumferentially, and the other cycloid disks are circumferentially fixed.

In some embodiment, the eccentric shaft has a plurality of eccentric portions, and eccentric phases of any two eccentric portions are the same or opposite.

In some embodiment, a number of the plurality of eccentric portions is even, wherein half of the plurality of eccentric portions collectively face to a first direction and the other half of eccentric portions face to a second direction, and the first direction and the second direction face are opposite.

In some embodiment, the pin tooth cycloid reducer further includes: at least one connector, to achieve a circumferential fixed connection of the cycloid disk.

In some embodiment, a number of the at least one connector is plural, and the connectors are uniformly distributed in the circumferential direction.

In some embodiment, the connector is selected from a group consisting of a pin, a bolt, and a screw.

In some embodiment, the cycloid disk fixed circumferentially is an integral structure.

In some embodiment, the connector includes a first connecting section and a second connecting section disposed in sequence in the axial direction, wherein the first connecting section connects to the cycloid disk in the first cycloid structure system, and the second connecting section connects to the cycloid disk in the second cycloid structure system; the first connecting section and the second connecting section are not disposed on a same line, so that cycloid disks fixed circumferentially have an angular difference in the circumferential direction.

In some embodiment, in at least one cycloid structures in the reducer, a pin tooth notch is disposed on an inner circumferential surface of the pin tooth housing, and the plurality of pin teeth are disposed in the pin tooth notch.

In some embodiment, the pin tooth cycloid reducer further includes: a limiter, wherein the limiter is configured to axially limit the plurality of pin teeth in the pin tooth notch.

In some embodiment, the limiter includes an annular isolation plate sleeved on the eccentric shaft, and the annular isolation plate is fixedly disposed at one axial end of the pin tooth notch.

In some embodiment, in at least one cycloid structure in the reducer, in the axial direction, the plurality of pin teeth are configured in at least two columns and pin teeth in a same column are distributed circumferentially.

In some embodiment, in the first cycloid structure system, a number of teeth of the cycloid disk is between 10-55, and a number of teeth of the pin tooth housing is between 10-55; and/or, in the second cycloid structure system, a number of teeth of the cycloid disk is between 10-55, and a number of teeth of the pin tooth housing is between 10-55.

In some embodiment, in the at least one cycloid structure in the reducer, the cycloid disk and the pin tooth housing are disposed in a one-to-one correspondence; or, in the at least one cycloid structure in the reducer, one cycloid disk corresponds to at least two pin tooth housings; or, at least two adjacent cycloid structures in the first cycloid structure system share a same pin tooth housing; or, at least two adjacent cycloid structures in the second cycloid structure system share a same pin tooth housing.

In some embodiment, in the first cycloid structure system, all pin tooth housings are fixedly connected, or the at least one cycloid structure in the first cycloid structure system shares a same pin tooth housing.

In some embodiment, in the second cycloid structure system, all pin tooth housings are fixedly connected, or the at least one cycloid structure in the second cycloid structure system shares a same pin tooth housing.

In some embodiment, in the first cycloid structure system, at least one cycloid disk is connected to the eccentric shaft via a bearing.

In some embodiment, in the second cycloid structure system, at least one cycloid disk is connected to the eccentric shaft through a bearing; and/or, at least one pin tooth housing is connected to the eccentric shaft via a bearing.

In some embodiment, the bearing includes a cage and a plurality of rollers disposed in the cage, and the plurality of rollers are in contact with the eccentric shaft and the cycloid disk.

In some embodiment, the pin tooth cycloid reducer further includes: an outer shell, wherein the pin tooth housing in the first cycloid structure system is fixedly disposed on the outer shell.

In some embodiment, in the second cycloid structure system, at least one pin tooth housing is connected to the outer shell via the bearing.

In some embodiment, the pin tooth cycloid reducer further includes: an oil seal, wherein the oil seal is disposed between the pin tooth housing and the outer shell, which are connected by a bearing.

In some embodiment, the pin tooth cycloid reducer further includes: a cover plate, wherein the cover plate, the pin tooth housing in the first cycloid structure system and the outer shell and are successively disposed in the axial direction; the pin tooth housing in the first cycloid structure system is axially fixed between the outer shell and the cover plate, wherein the cover plate is connected to the eccentric shaft via the bearing.

An industrial robot is further provided, including: a power source and an actuator, and further including: the pin tooth cycloid reducer, wherein the pin tooth cycloid reducer, configured to reduce a rotation speed of the power source and output the reduced speed to the actuator, is fixed disposed between the power source and the actuator Compared with the prior art, embodiments of the present disclosure have the following advantages.

According to embodiments of the present disclosure, a first cycloid structure system and a second cycloid structure system in the pin tooth cycloid reducer is disposed in an axial direction, and the cycloid disk in the first cycloid structure system and the cycloid disk in the second cycloid structure system are fixed circumferentially, and the cycloid disk is rotatably disposed on the eccentric shaft. When the eccentric shaft rotates, the cycloid disk in the first cycloid structure system performs a cycloid motion in the pin tooth housing. In this way, a rotation motion of the eccentric shaft is converted into a cycloid motion including a rotation of the cycloid disk on its own axis and a revolve motion on the eccentric shaft. The cycloid disk in the second cycloid structure system cooperates with the corresponding pin tooth housing to drive the pin tooth housing to rotate on its own axis. In this way, the cycloid motion of the cycloid disk is converted into the rotation of the pin tooth housing on its own axis.

During the transmission of power from the eccentric shaft to the cycloid disk in the first cycloid structure system, the pin tooth cycloid reducer undergoes a first deceleration. During the transmission of power from the cycloid disk to the pin tooth housing in the second cycloid structure system, the pin tooth cycloid reducer undergoes a second deceleration. Therefore, deceleration and increasing of the torque can be achieved. Moreover, the rotation motion of the pin tooth housing on its own axis does not change the motion of the eccentric shaft and thus can directly output power as an output end.

In addition, in embodiments of the present disclosure, a planet carrier is not used during converting the cycloid motion into the rotation motion in the pin tooth cycloid reducer, therefore, compared with the conventional technology, the structure is relatively simple and easy to produce and manufacture, and the product yield can be increased. Moreover, it also makes the pin tooth cycloid reducer not easily damaged during use, which improves product quality.

DETAILED DESCRIPTION

Figure 1:
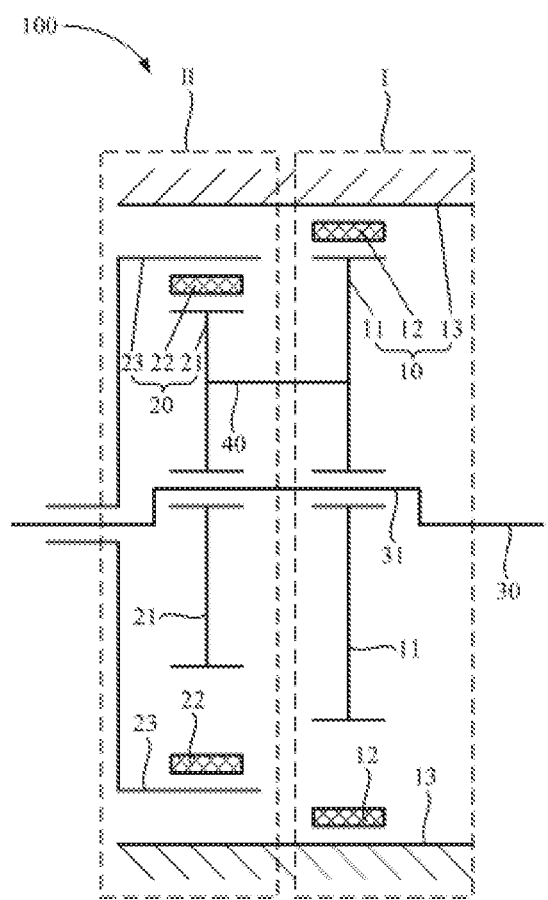
FIG. 1 schematically illustrates a diagram of a motion transmission relationship of a pin tooth cycloid reducer according to an embodiment of the present disclosure.

In a conventional industrial robot, in order to output the torque that output from the power source to an actuator to drive the actuator to perform corresponding operations, it is usually required to reduce a high rotation speed of the power source like a motor or an internal combustion engine, to a low rotation speed. At present, a pin tooth cycloid reducer is configured to reduce the rotation speed. The core component of the pin tooth cycloid reducer includes a cycloid structure, and the cycloid structure mainly includes: a cycloid disk, a plurality of pin teeth and a pin tooth housing, successively disposed from inside to outside in a radial direction.

An eccentric shaft passes through the cycloid disk as an input end. When the eccentric shaft rotates, the cycloid disk performs a cycloid motion in an area enclosed by the pin tooth housing for deceleration (that is, to reduce a rotation speed of the eccentric shaft). However, the cycloid motion of the cycloid disk includes a rotation motion of the cycloid disk on its own axis and a revolve motion on the eccentric shaft, and therefore, the cycloid disk cannot directly output power as the power output end.

In the convention technology, in order to convert the cycloid motion of the cycloid disk into a rotation motion capable of being used as an output power, a planet carrier is generally provided, and the planet carrier and the pin tooth housing are coaxially disposed, and the planetary carrier and the cycloid disk are connected via an additional eccentric shaft. And usually, plural eccentric shafts are provided along the circumferential direction. So that when the cycloid disk rotates, the planetary carrier can be driven to rotate on its own axis as a power output end to output power.

However, studies show that extremely high requirements needed for manufacturing precise components for this kind of reducers. For example, the plural eccentric shafts disposed between the planetary carrier and the cycloid disk should be strictly in parallel. If there is an angular difference between any two eccentric shafts, stress concentration would be caused, which results in wear or damage. Further, due to the high requirements for manufacturing precision, special care must be taken during the specific use process. Once the external force or operation error happens, the reducer can easily be damaged.

The present disclosure inventively proposes a new pin tooth cycloid reducer where the motion conversion of the pin tooth cycloid reducer does not take the form of the planet carrier as above described.

Specifically, another cycloid structure (a second cycloid structure) is disposed along the axial direction based on an original cycloid structure (a first cycloid structure), and a first cycloid disk in the first cycloid structure is fixedly connected to the second cycloid disk in the second cycloid structure.

When the eccentric shaft rotates on its own axis as an input end to drive the first cycloid disk to perform the cycloid motion, the first cycloid disk drives the second cycloid disk to perform the cycloid motion. The second cycloid disk cooperates with the second pin tooth housing in the second cycloid structure to drive the second pin tooth housing to rotate on its own axis, and the second pin tooth housing as an output end outputs power, to realize the conversion of the motion form.

Therefore, the present disclosure provides a pin tooth cycloid reducer, and the pin tooth cycloid reducer includes: a first cycloid structure system and a second cycloid structure system, disposed along an axial direction, wherein the first cycloid structure system is sleeved on an eccentric shaft, and each cycloid structure system includes at least one cycloid structure in the axial direction.

The cycloid structure includes: a cycloid disk, a plurality of pin teeth distributed circumferentially and a pin tooth housing, successively disposed from inside to outside in a radial direction; the plurality of pin teeth are rotatably fixed to the pin tooth housing, and the cycloid disk engages with the plurality of pin teeth.

All pin tooth housings in the pin tooth cycloid reducer are coaxially disposed; at least one cycloid disk in the second cycloid structure system and at least one cycloid disk in the first cycloid structure system are circumferentially fixed, and circumferentially fixed cycloid disks are coaxially disposed.

When the eccentric shaft rotates, each of cycloid disks in the first cycloid structure system rotates at a first angle $\alpha$ relative to a corresponding pin tooth housing, and each of cycloid disks in the second cycloid structure system rotates at a second angle $\beta$ relative to a corresponding pin tooth housing, where the first angle $\alpha$ does not equal to the second angle $\beta$, that is, $\alpha \neq \beta$.

In the present disclosure, the first cycloid structure system may include one cycloid structure, or may include a plurality of cycloid structures. The second cycloid structure system may include one cycloid structure, or may include a plurality of cycloid structures; as long as one of cycloid disks in the first cycloid structure system is fixedly connected to one of cycloid disk in a coaxially-disposed second cycloid structure system, the power transmission can be realized and the motion form can be changed.

In addition, during the eccentric shaft rotation, if different cycloid disks in the first cycloid structure system rotates different angles relative to the corresponding pin tooth housings; or, if different cycloid disks in the second cycloid structure system rotates different angles relative to the corresponding pin tooth housings, cycloid disks with different rotation speeds interfere with each other, which causes that the pin tooth cycloid reducer fails to operate normally.

Therefore, all cycloid structures in the first cycloid structure system need to rotate a same first angle $\alpha$ relative to corresponding pin tooth housings, and all cycloid structures in the first cycloid structure system need to rotate a same second angle $\beta$ relative to corresponding pin tooth housings. And, the first angle $\alpha$ and the second angle $\beta$ does not equal, or, the motion cannot be output as power.

The foregoing objects, features and advantages of the present disclosure will become more apparent from the following detailed description of specific embodiments in conjunction with the accompanying drawings.

In some embodiment, in the first cycloid structure system, there is one cycloid structure; and in the second cycloid structure system, there is one cycloid structure.

Figure 2:
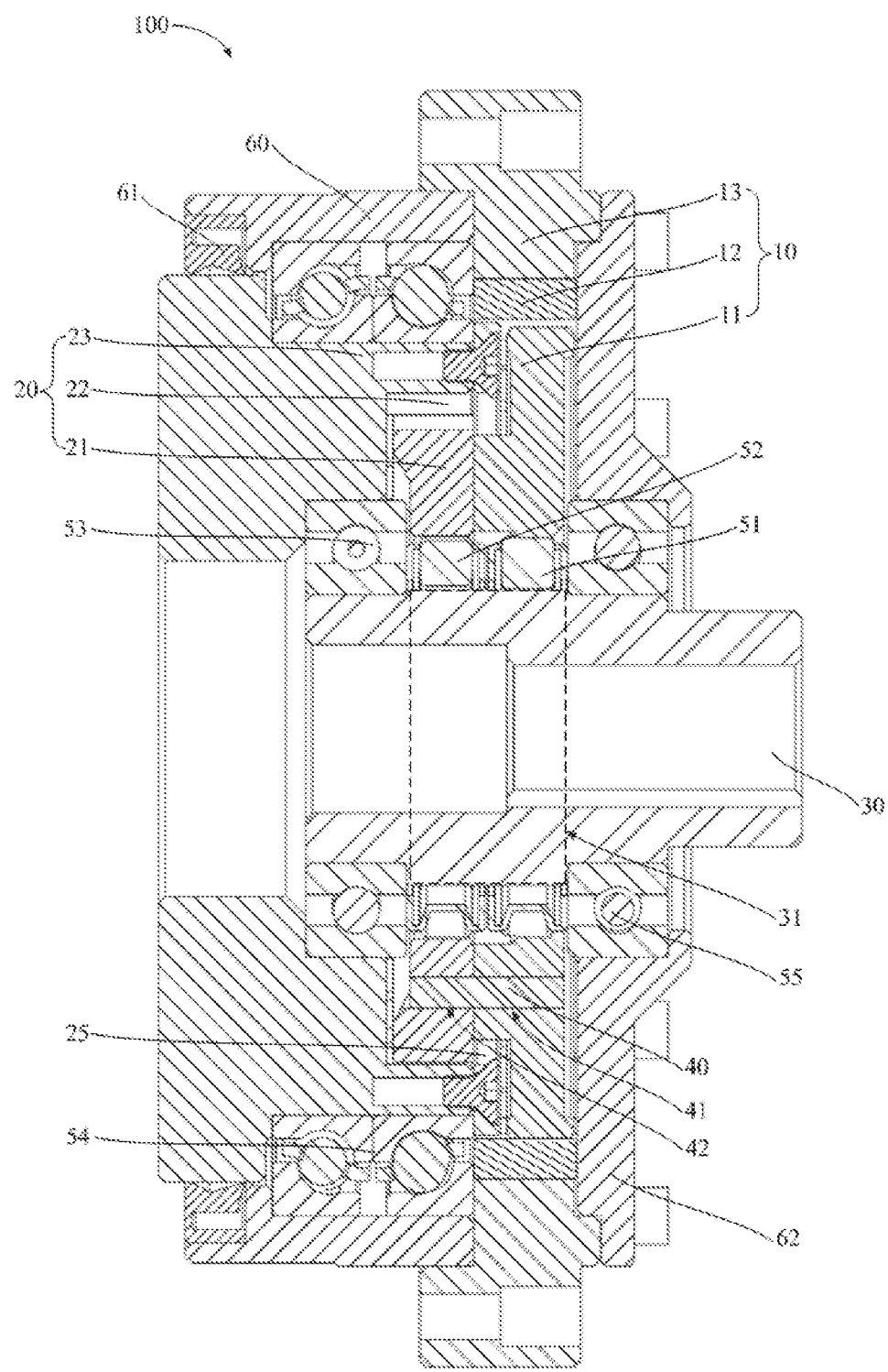
FIG. 2 schematically illustrates a structural diagram of a pin tooth cycloid reducer according to an embodiment of the present disclosure.
Figure 3:
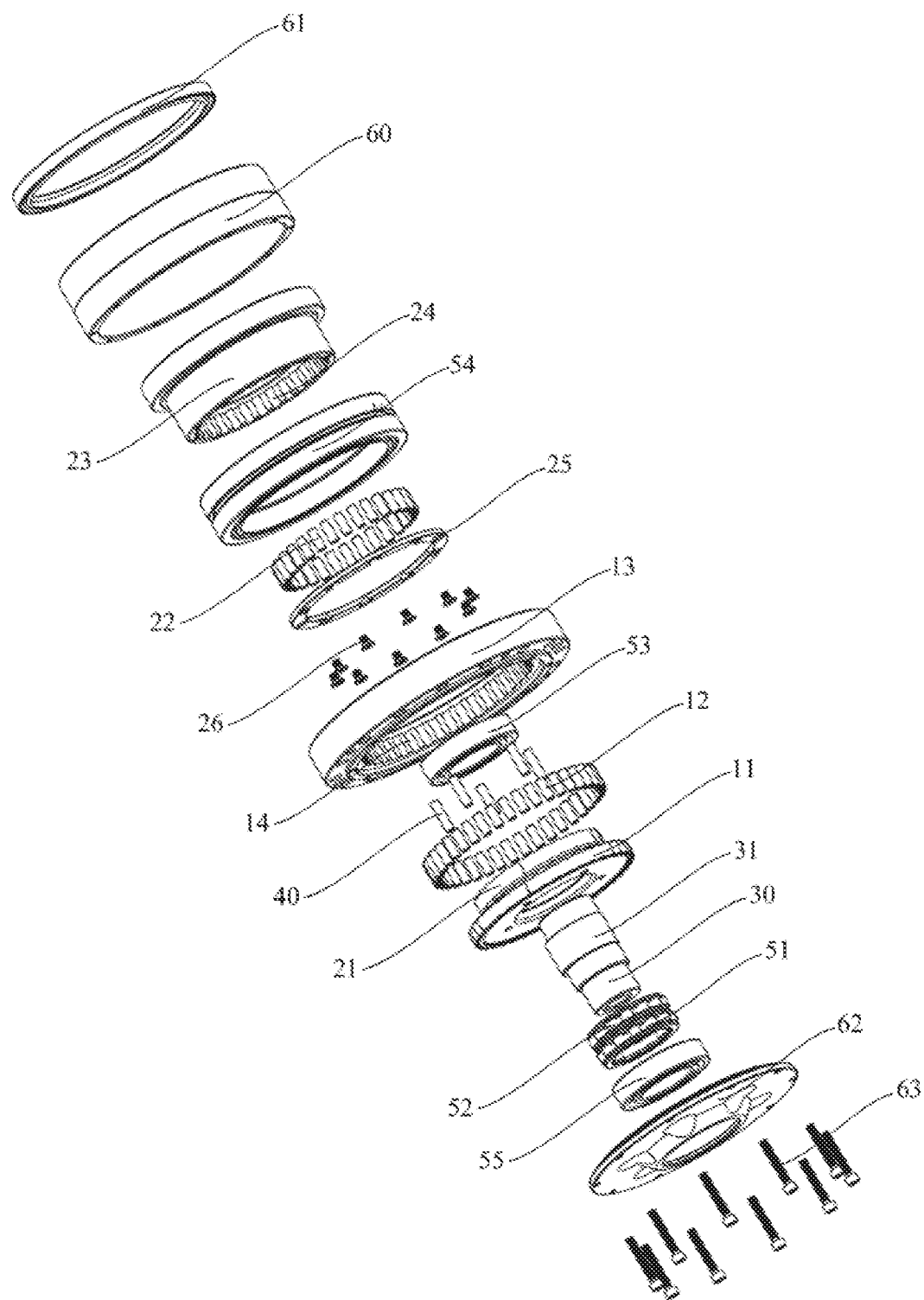
FIG. 3 schematically illustrates an exploded perspective view of the pin tooth cycloid reducer shown in FIG. 2.

Referring to FIG. 1, FIG. 2 and FIG. 3, a pin tooth cycloid reducer 100 includes a first cycloid structure system I and a second cycloid structure system II disposed along an axial direction. The first cycloid structure system I includes a first cycloid structure 10, and the second cycloid system II includes a second cycloid structure 20.

The first cycloid structure 10 includes: a first cycloid disk 11, a plurality of first pin teeth 12 distributed circumferentially and a first pin tooth housing 13, successively disposed from inside to outside in a radial direction; the plurality of first pin teeth 12 are rotatably fixed to the first pin tooth housing 13, and the first cycloid disk 11 engages with the plurality of first pin teeth 12.

The second cycloid structure 20 includes: a second cycloid disk 21, a plurality of second pin teeth 22 disposed circumferentially and a second pin tooth housing 23, successively disposed from inside to outside in a radial direction; the plurality of second pin teeth 22 are rotatably fixed to the second pin tooth housing 23, and the second cycloid disk 21 engages with the plurality of second pin teeth 22.

The pin tooth cycloid reducer 100 further includes: an eccentric shaft 30, where the eccentric shaft 30 has an eccentric portion 31. In the axial direction of the eccentric shaft, the eccentric portion 31 has a same eccentric phase and eccentricity at each position in the axial direction. The first cycloid disk 11 is rotatably sleeved on the eccentric portion 31.

In some embodiment, the first pin tooth housing 13 and the second pin tooth housing 23 are coaxially disposed; the first cycloid disk 11 and the second cycloid disk 21 are circumferentially fixed and coaxially disposed. When the eccentric shaft 30 rotates, the first cycloid disk 11 rotates at a first angle α relative to the first pin tooth housing 13, and the second cycloid disk 21 rotates at a second angle β relative to the second pin tooth housing 23. The angle α does not equal to the second angle β.

Therefore, when the eccentric shaft 30 rotates as an input end, the first cycloid disk 11 disposed on the eccentric portion 31 performs a cycloid motion in an area enclosed by a boundary of the first pin tooth housing 13 (the first cycloid disk rotates on its own axis and revolves on the eccentric shaft); further, the first cycloid disk 11 drives the second cycloid disk 21 fixedly connected in the circumferential direction to perform the cycloid motion, and the second pin tooth housing 23 starts to rotate on its own axis with the cooperation of the second cycloid disk 21 and the second pin tooth housing 23. The rotation of the second pin tooth housing 23 on its own axis does not change the motions (all of which are rotations on their own axes) of the eccentric shaft 30, and therefore, the second pin tooth housing 23 can directly output power as an output end.

Specifically, in the transmission of power to the first cycloid structure 10 by the eccentric shaft 30, if the first pin tooth housing 13 keeps fixed in the circumferential direction, assuming that the rotation speed of the eccentric shaft 30 is V, the number of teeth of the first pin tooth housing 13 is M1, and the number of teeth of the first cycloid disk 11 is N1 (M1>N1), the rotation speed V1 of the first cycloid disk 11 is: $V1=V/(M1/(M1-N1))$. If the first cycloid disk 11 and the second cycloid disk 21 are fixed circumferentially, the rotation speed V1 of the second cycloid disk 21 is: $V1=V/(M1/(M1-N1))$. If the number of teeth of the second pin tooth housing 23 is M2, and the number of teeth of the second cycloid disk 21 is N2 (M2>N2), the rotation speed V2 of the second pin tooth housing 23 is: $V2=V/(M2/(M2-N2))-V/(M1/(M1-N1))$.

If: $i1=M1/(M1-N1)$, $i2=M2/(M2-N2)$.

When $i1=i2$, the rotation speed of the second pin tooth housing 23 is: $V2=0$; in this way, the second pin tooth housing 23 is fixed circumferentially relative to the first pin tooth housing 13, and the second pin tooth housing 23 cannot be used as a power output.

When $i1<i2$, the rotation speed of the second pin tooth housing 23 is: $V2=V/i2-V/i1$; in this way, the second pin tooth housing 23 rotate circumferentially relative to the first pin tooth housing 13 and can be used as a power output, deceleration can be achieved, and the rotation direction of the second pin tooth housing 23 is opposite to the rotation direction of the eccentric shaft 30.

When $i1>i2$, the rotation speed of the second pin tooth housing 23 is: $V2=V/i2-V/i1$; in this way, the second pin tooth housing 23 rotate circumferentially relative to the first pin tooth housing 13 and can be used as a power output, deceleration can be achieved, and the rotation direction of the second pin tooth housing 23 is the same as the rotation direction of the eccentric shaft 30.

In the cycloid structure, M–N represents a tooth difference, which is the difference between the number of teeth of a pin tooth housing and the number of teeth of a cycloid disk.

When M–N=1, it means there is 1 tooth difference. That is, when the cycloid disk turns one circle on a pin tooth housing, the cycloid disk advances 1 tooth relative to the pin tooth housing; when M–N=2, it means there is 2 teeth differences. That is, when one cycloid disk turns 1 circle on a pin tooth housing, the cycloid disk advances 2 teeth relative to the pin tooth housing. By analogy, according to requirements, it is possible to design cycloid structures with specific tooth differences.

In some embodiment, if the first cycloid structure 10 has one tooth difference, and the second cycloid structure 20 has one tooth difference, the rotation speed of the eccentric shaft 30 is V.

Therefore, the rotation speed V1 of the first cycloid disk 11 is $V1=V/M1$, the rotation speed of the second cycloid disk 21 is: $V1=V/M1$, and the rotation speed V2 of the second pin tooth housing 23 is: $V2=V/M2-V/M1$.

Where, if M1=M2, the second pin tooth housing 23 cannot be used as a power output; if M1<M2, the rotation direction of the second pin tooth housing 23 is opposite to the rotation direction of the eccentric shaft 30; if M1>M2, the rotation direction of the second pin tooth housing 23 is the same as the rotation direction of the eccentric shaft 30.

As described above, both the first cycloid structure 10 and the second cycloid structure 20 have one teeth difference. In other embodiments, the first cycloid structure 10 may also have a tooth difference in two teeth or more, and the second cycloid structure 20 may also have a tooth difference in two teeth or more.

In addition, it should be noted that, when the first cycloid structure system I includes a plurality of cycloid structures, in order to prevent cycloid disks from interfering with each other, during the rotation of the eccentric shaft, in all cycloid structures, cycloid disks need to rotate the same first angle α relative to corresponding pin tooth housings, but different cycloid structures may have different tooth differences; when the second cycloid structure system II includes a plurality of cycloid structures, in order to prevent cycloid disks from interfering with each other, during the rotation of the eccentric shaft, in all cycloid structures, cycloid disks need to rotate the same first angle β relative to corresponding pin tooth housings, but different cycloid structures may have different tooth differences.

In some embodiment, the pin tooth cycloid reducer converts the cycloid motion into the rotation motion without the planet carrier. Therefore, the overall structure is relatively simple and easy to produce and manufacture. The product yield can be increased. In addition, since planets are not involved, it also makes the pin tooth cycloid reducer not easily damaged during use, so that the product quality can be improved.

It should be noted that, in a cycloid structure, the cycloid disk and the pin tooth housing may be disposed in a one-to-one correspondence, or one cycloid disk may correspond to more than two pin tooth housings. In addition, only one column of pin teeth may be disposed between the cycloid disk and the pin tooth housing, and two or more column of needle teeth may also be disposed in the circumferential direction.

In some embodiment, the first cycloid structure 10 only includes one first pin tooth housing 13 and one column of first pin teeth 12, and the second cycloid structure 20 includes only one second pin tooth housing 23 and one column of second pin teeth 22.

Referring to FIG. 1, the eccentric shaft 30 passes through the second cycloid structure 20 axially, that is, the first cycloid structure 10 and the second cycloid structure 20 are all sleeved on the eccentric shaft 30. Specifically, the first cycloid disk 11 and the second cycloid disk 21 are rotatably sleeved on the eccentric portion 31 to ensure that the first cycloid disk 11 and the second cycloid disk 21 are coaxially disposed; the non-eccentric portion of the eccentric shaft 30 passes through the center positions of the first pin tooth housing 13 and the second pin tooth housing 23 to ensure that the first pin tooth housing 13 and the second pin housing 23 are coaxially disposed.

In some embodiments, the eccentric shaft 30 merely passes through the first cycloid structure 10. The other pinion shaft located on the same line as the eccentric shaft 30 passes through the second pin tooth housing 23 to realize that the first pin tooth housing 13 and the second pin tooth housing 23 are coaxially disposed; the second cycloid disk 21 is directly fixed on the first cycloid disk 11, so that the first cycloid disk 11 and the second cycloid disk 21 are coaxially disposed.

Referring to FIG. 2 and FIG. 3, the pin tooth cycloid reducer 100 further includes at least one connector 40, and the at least one connector 40 are configured to circumferentially and fixedly connect the first cycloid disk 11 and the second cycloid disk 21. Specifically, the first cycloid disk 11 has a first mounting hole 41 configured axially, and the second cycloid disk 21 has a second mounting hole 42 configured axially, and the first mounting hole 41 and the second mounting hole 42 are axially opposed to each other. The at least one connector 40 are respectively inserted into the first mounting hole 41 and the second mounting hole 42 to fix the first cycloid disk 11 and the second cycloid disk 21 circumferentially.

The at least one connector 40 may be a pin, a bolt, a screw, or any combination of them. Specifically, when the first cycloid disk 11 and the second cycloid disk 21 respectively have one first mounting hole 41 and one second mounting hole 42 disposed oppositely, the at least one connector 40 may adopt any one of the pin, the screws or the bolt. When the first cycloid disk 11 and the second cycloid disk 21 respectively have a plurality of first mounting hole 41 and second mounting hole 42 disposed oppositely, the at least one connector 40 may adopt any one or any combination of the pin, the screws or the bolt.

In some embodiment, in order to make the circumferential fixing of the first cycloid disk 11 and the second cycloid disk 21 more reliable, at least one of connector 40 may be provided, so that the at least one connector 40 are uniformly distributed in the circumferential direction. Correspondingly, the first cycloid disk 11 and the second cycloid disk 21 are respectively provided with a plurality of first mounting hole 41 and second mounting hole 42 uniformly distributed in the circumferential direction.

It should be noted that, the at least one connector 40 functions to fix the first cycloid disk 11 and the second cycloid disk 21 in the circumferential direction. Other manners can be adopted to fix the first cycloid disk 11 and the second cycloid disk 21 in the circumferential. For example, the first cycloid disk 11 and the second cycloid disk 21 may be an integral structure; or, the second cycloid disk 21 is fixed on the first cycloid disk 11 by snapping or gluing.

Referring to FIG. 3, the plurality of first pin teeth 12 are rotatably fixed to the first pin tooth housing 13 in a way that a plurality of first pin tooth notch 14 are configured on an inner circumferential surface of the first pin tooth housing 3, where the plurality of first pin tooth notch 14 are disposed in a one-to-one correspondence with the first teeth 12, the first teeth 12 are fixedly disposed in the first tooth notch 14, and the first teeth 12 can rotate around themselves.

When the first cycloid disk 11 performs the cycloid motion in the first pin tooth housing 13, the first cycloid disk 11 can engage with the plurality of first pin teeth 12, and there is no relative sliding between the first cycloid disk 11 and the plurality of first pin teeth 12, and the rotation of the plurality of first pin teeth 12 causes a relative rotation between the first cycloid disk 11 and the first pin tooth housing 13.

Similarly, the plurality of second pin teeth 22 are rotatably fixed to the second pin tooth housing 23 in a way that a plurality of second pin tooth notch 24 are configured on an inner circumferential surface of the second pin tooth housing 23, where the plurality of second pin tooth notch 24 are disposed in a one-to-one correspondence with the second teeth 22, the second teeth 22 are fixedly disposed in the second tooth notch 24, and the second teeth 22 can rotate around themselves.

In the first cycloid structure 10, the number of teeth of the first cycloid disk 11 and the number of teeth of the first pin tooth housing 13 can be set according to requirements. In some embodiment, the number of teeth of the first cycloid disk 11 is between 10-55, and the number of teeth of the first pin tooth housing 13 is between 10-55, so that the manufacture of the first cycloid disk 11 and the first pin tooth housing 13 can be facilitated.

Similarly, in the second cycloid structure 20, the number of teeth of the second cycloid disk 21 and the number of teeth of the second pin tooth housing 23 can be set according to requirements. In some embodiment, the number of teeth of the second cycloid disk 21 is between 10-55, and the number of teeth of the second pin tooth housing 23 is between 10-55, so that the manufacture of the second cycloid disk 21 and the second pin tooth housing 23 can be facilitated.

Referring to FIG. 2 and FIG. 3, a first bearing 51 is disposed between the first cycloid disk 11 and the eccentric portion 31. That is, the first cycloid disk 11 is connected to the eccentric portion 31 via the first bearing 51, to realize the first cycloid disk 11 is rotatably sleeved on the eccentric portion 31; a second bearing 52 is disposed between the second cycloid disk 21 and the eccentric portion 31, that is, the second cycloid disk 21 is connected to the eccentric portion 31 via the second bearing 52, to realize the second cycloid disk 21 is rotatably sleeved on the eccentric portion 31.

The first bearing 51 includes a cage and a plurality of rollers disposed in the cage, and the plurality of rollers of the first bearing respectively are in contact with the eccentric portion 31 and the first cycloid disk 11. The second bearing 52 includes a cage and rollers disposed in the cage, and the rollers of the second bearing are also respectively in contact with the eccentric portion 31 and the second cycloid disk 21. In other words, the first bearing 51 and the second bearing 52 are not provided with an inner ring and an outer ring, so that the radial dimension of the first cycloid structure 10 and the second cycloid structure 20 can be more compact.

It should be noted that the first bearing 51 and the second bearing 52 may be designed as one bearing, that is, the first cycloid disk 11 and the second cycloid disk 21 are collectively sleeved on the one bearing. In addition, the first bearing 51 and the second bearing 52 may also be provided with an inner ring and an outer ring, which does not affect the implementation of the present disclosure.

In addition, a third bearing 53 is disposed between the second pin tooth housing 23 and the eccentric shaft 30. That is, the second pin tooth housing 23 is connected to the eccentric shaft 30 via the third bearing 53, so that the second pin tooth housing 23 can be rotatably sleeved on the eccentric shaft 30. By doing so, on one hand, it can be ensured that the second pin tooth housing 23 and the first pin tooth housing 13 are disposed coaxially; on the other hand, when the eccentric shaft 30 is configured as an input end and the second pin tooth housing 23 is configured as the output end, the eccentric shaft 30 and the second pin tooth housing 23 may have different rotation speeds.

In some embodiment, the pin tooth cycloid reducer 100 further includes an outer shell 60. The first cycloid structure 10, the second cycloid structure 20, and the eccentric shaft 30 are fixedly disposed in the outer shell 60. There is a fourth bearing 54 between the second pin tooth housing 23 and the outer shell 60. The second pin tooth housing 23 is connected to the inner circumferential surface of the outer shell 60 through the fourth bearing 54, so that the second pin tooth housing 23 can be rotated relative to the outer shell 60 as a power output.

During operation of the pin tooth cycloid reducer 100, the interior of the pin tooth cycloid reducer 100 is usually provided with lubricating oil for lubrication between moving parts. In order to prevent the lubricating oil from leaking to the outside, or to prevent foreign matter from entering the inside of the pin tooth cycloid reducer 100, an oil seal 61 is disposed between the outer shell 60 and the second pin tooth housing 23.

Specifically, the oil seal 61 is an annular seal ring. The outer shell 60 is provided with an annular groove, and the annular seal ring is fixedly disposed in the annular groove. In addition, the oil seal can also use other types of seals that have a sealing effect.

The cycloid reducer 100 further includes a cover plate 62. The cover plate 62, the first pin housing 13, and the outer housing 60 are successively disposed in the axial direction. By a screw 63, a radial outer edge of the first pin tooth housing 13 is axially fixed between the outer shell 60 and the cover plate 62. The cover plate 62 has a central hole, and the eccentric shaft 30 passes through the central hole. A fifth bearing 55 is also disposed between the cover plate 62 and the eccentric shaft 30. The cover plate 62 is connected to a outer circumferential surface of the eccentric shaft 30 via the fifth bearing 55. So that the eccentric shaft 30 can rotate relative to the cover plate 62 as a power input.

In some embodiment, it should be noted that the third bearing 53, the fourth bearing 54 and the fifth bearing 55 may not be provided with or without an inner ring and an outer ring, which does not affect the implementation of the technical solution.

The pin tooth cycloid reducer 100 further includes a limiter 25, and the limiter 25 is an annular isolation plate sleeved on the eccentric shaft 30. The annular isolation plate is fixedly disposed in one axial end of the second pin tooth housing 23 by using a screw 26, to prevent the plurality of second pin teeth 22 from axially sliding out of the second pin tooth notch 24. At the other axial end of the plurality of second pin teeth 22, the second pin tooth housing 23 acts as a limiter to prevent the plurality of second pin teeth 22 from axially sliding out of the second pin tooth notch 24 from the other end.

In addition, the annular isolation plate is also in contact with the fourth bearing 54 to axially limit the fourth bearing 54 and prevent the fourth bearing 54 from oscillating axially.

Two axial ends of the first pin 12 are respectively provided with the fourth bearing 54 and the cover plate 62. The fourth bearing 54 and the cover plate 62 respectively act as limiters of the plurality of first pin teeth 12 to prevent the plurality of first pin teeth 12 from axially sliding out of the first tooth notch 14.

In some embodiment, annular plates may also be disposed on both axial ends of the plurality of first pin teeth 12 as the limiter 25 to prevent the plurality of first pin teeth 12 from axially sliding out of the first pin tooth notch 14; or, annular plates may be disposed on both axial ends of the plurality of second pin teeth 22 as the limiter 25 to prevent the plurality of second pin teeth 22 from axially sliding out of the second pin tooth notch 24.

An industrial robot is provided in some embodiment, the industrial robot includes: a power source, an actuator and the pin tooth cycloid reducer 100 as described above. The pin tooth cycloid reducer 100 is fixed disposed between the power source and the actuator, and the power source is connected to the eccentric shaft 30 to drive the eccentric shaft 30 to rotate; the second pin case 23 is connected to the actuator to drive the actuator to operate, and the rotation speed of the second pin tooth housing 23 is lower than the rotation speed of the eccentric shaft 30, so that a rotation speed of the power source is reduced and output to the actuator.

In some embodiment, in the first cycloid structure system I, the number of the cycloid structure is two; in the second cycloid structure system II, the number of the cycloid structure is two.

Figure 4:
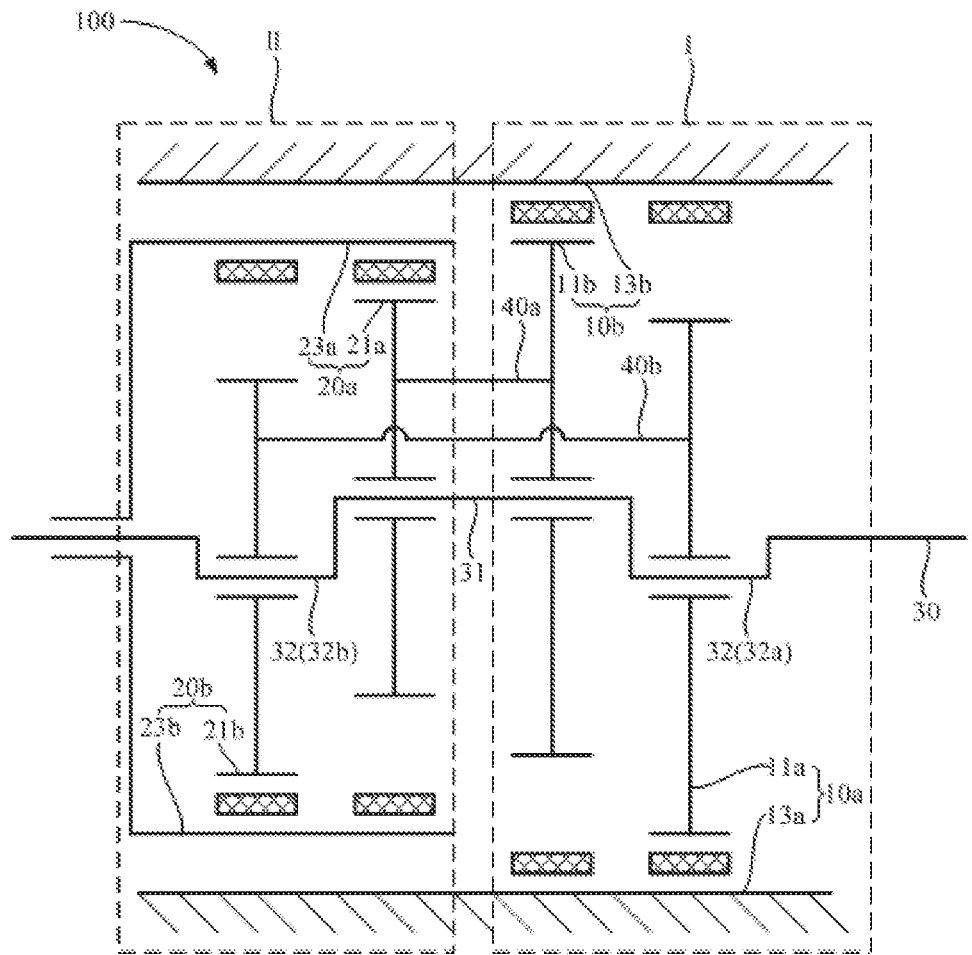
FIG. 4 schematically illustrates a diagram of a motion transmission relationship of a pin tooth cycloid reducer according to an embodiment of the present disclosure.
Figure 5:
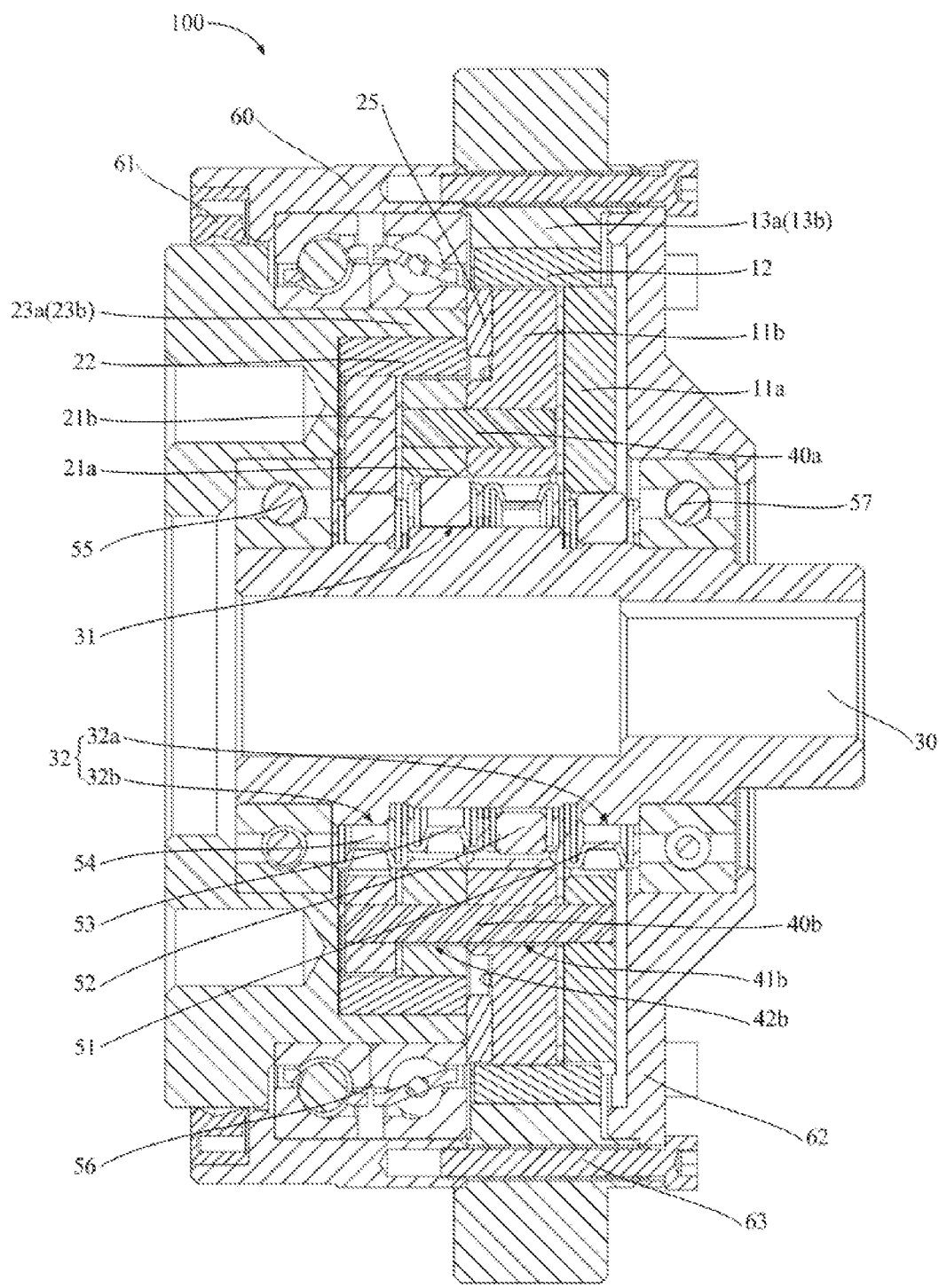
FIG. 5 schematically illustrates a structural diagram of a pin tooth cycloid reducer according to an embodiment of the present disclosure.
Figure 6:
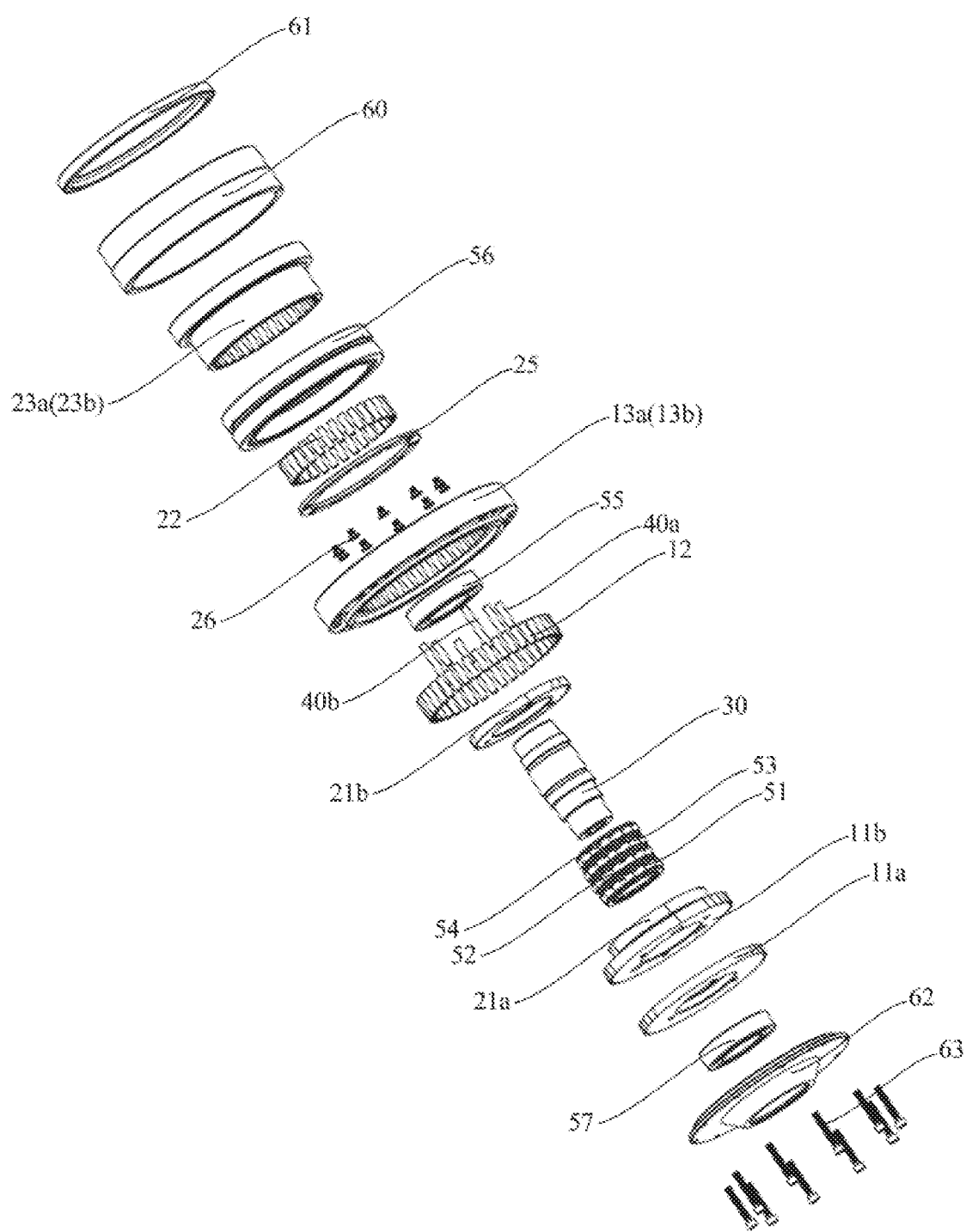
FIG. 6 schematically illustrates an exploded perspective view of the pin tooth cycloid reducer shown in FIG. 5.

Referring to FIG. 4, FIG. 5 and FIG. 6, a pin tooth cycloid reducer 100 includes a first cycloid structure system I and a second cycloid structure system II disposed in an axial direction. The first cycloid structure system I includes a first cycloid structure 10a, and a second cycloid structure 10b. When the eccentric shaft 30 rotates, cycloid disks in the first cycloid structure 10a and a second cycloid structure 10b rotate at a first angle α. The second cycloid structure system II includes a third cycloid structure 20a, and a second cycloid structure 20b. When the eccentric shaft 30 rotates, cycloid disks in the third cycloid structure 20a and a fourth cycloid structure 20b rotate at a first angle β. The angle α does not equal to the second angle β.

An eccentric shaft 30 has two eccentric portions, which are a first eccentric portion 31 and a second eccentric portion 32 respectively. Eccentric phases of the first eccentric portion 31 and the second eccentric portion 32 are opposite.

Referring to FIG. 4, the first pin tooth housing 13a, the second pin tooth housing 13b, the third pin tooth housing 23a, and the fourth pin tooth housing 23b are all coaxially disposed; the second cycloid disk 11b and the third cycloid disk 21a are circumferentially fixed and coaxially sleeved on the first eccentric portion 31; the first cycloid disk 11a and the fourth cycloid disk 21b are circumferentially fixed and coaxially sleeved on the second eccentric portion 32.

Because the eccentric phases of the first eccentric portion 31 and the second eccentric portion 32 are opposite, when the eccentric shaft 30 rotates, the first cycloid disk 11a and the second cycloid disk 11b are symmetrically disposed on both sides of the eccentric shaft 30 in the radial direction. The third cycloid disk 21a and the fourth cycloid disk 21b are symmetrically disposed on both sides of the eccentric shaft 30 in the radial direction. Therefore, it is possible to improve the dynamic balance of the pin tooth cycloid reducer 100. Especially when the eccentric shaft 30 has a high rotation speed and a large load, the vibration of the pin tooth cycloid reducer 100 can be effectively reduced.

When the eccentric shaft 30 rotates as an input end, the second cycloid disk 11b disposed on the first eccentric portion 31 performs a cycloid motion enclosed by a boundary of the second pin tooth housing 13b, the first cycloid disk 11a disposed on the second eccentric portion 32 performs a cycloid motion enclosed by a boundary of the first pin tooth housing 13a.

The first cycloid disk 11a and the second cycloid disk 11b have a same rotation speed, and drive the third cycloid disk 21a and the fourth cycloid disk 21b to perform a cycloid motion at the same rotation speed.

The third cycloid disk 21a and the fourth cycloid disk 21b enable the third pin tooth housing 23a and the fourth pin tooth housing 23b to rotate on their own axes and have the same rotation speed. Therefore, the third pin tooth housing 23a and the fourth pin tooth housing 23b can directly output power as an output end.

Specifically, in some embodiment, the first pin tooth housing 13a and the second pin tooth housing 13b are the same pin tooth housing, that is, the first cycloid structure 10a and the second cycloid structure 10b share the same pin tooth housing. The third pin tooth housing 23a and the fourth pin tooth housing 23b are the same pin tooth housing, that is, the third cycloid structure 20a and the fourth cycloid structure 20b share the same pin tooth housing.

Referring to FIG. 5 and FIG. 6, the second eccentric portion 32 includes a first eccentric block 32a and a second eccentric block 32b. The first eccentric block 32a and the second eccentric block 32b are respectively disposed on both sides of the first eccentric portion 31 in the axial direction. The first cycloid disk 11a is rotatably sleeved on the first eccentric block 32a, and the fourth cycloid disk 21b is rotatably sleeved on the second eccentric block 32b.

That is to say, the first cycloid disk 11a and the fourth cycloid disk 21b are respectively disposed on both sides of the second cycloid disk 11b and the third cycloid disk 21a in the axial direction. In this way, the second cycloid disk 11b and the third cycloid disk 21a with the shortest axial distance are fixedly connected in the circumferential direction, and the manner of circumferentially fixing can be referred to the previous embodiment. Specifically, at least one connector or an integral molding method ma) be used to achieve the circumferential fixing.

The first cycloid disk 11a and the fourth cycloid disk 21b with the longest axial distance are fixedly connected in the circumferential direction, and the manner of circumferentially fixing can be also referred to the previous embodiment, and specifically, at least one connector may be used to achieve the circumferential fixing. However, it should be noted that, since the second cycloid disk 11b and the third cycloid disk 21a are disposed between the first cycloid disk 11a and the fourth cycloid disk 21b. When the first cycloid disks 11a and the fourth cycloid disk 21b are connected by means of the connector, the connector needs to pass through the second cycloid disk 11b and the third cycloid disk 21a. Therefore, it is necessary to provide a through hole for allowing the connector to pass through in the second cycloid disk 11b and the third cycloid disk 21a.

In some embodiment, the pin tooth cycloid reducer 100 includes a first connector 40a and a second connector 40b. The first connector 40a is configured to fixedly connect the second cycloid disk 11b and the third cycloid disk 21a in the circumferential direction. The second connector 40b is configured to fixedly connect the first cycloid disk 11a and the fourth cycloid disk 21b in the circumferential direction.

Specifically, the second cycloid disk 11b has a first through hole 41b disposed axially, and the third cycloid disk 21a has a second through hole 42b disposed axially, and the first through hole 41b and the second through hole 42b are axially opposed to each other. The second connector 40b passes through the first through hole 41b and the second through hole 42b to achieve circumferential fixing of the first cycloid disk 11a and the fourth cycloid disk 21b.

In addition, a relative motion occurs between the first cycloid disk 11a and the second cycloid disk 11b when the eccentric shaft 30 rotates, and the third cycloid disk 21a and the fourth cycloid disk 21b also generate the relative motion. Therefore, the first through hole 41b and the second through hole 42b should be larger than a diameter of the second connector 40b, to prevent the first through hole 41b and the second through hole 42b from interfering with the second connector 40b during operation, and obstructing the motion of the cycloid disk may be avoided.

Figure 7:
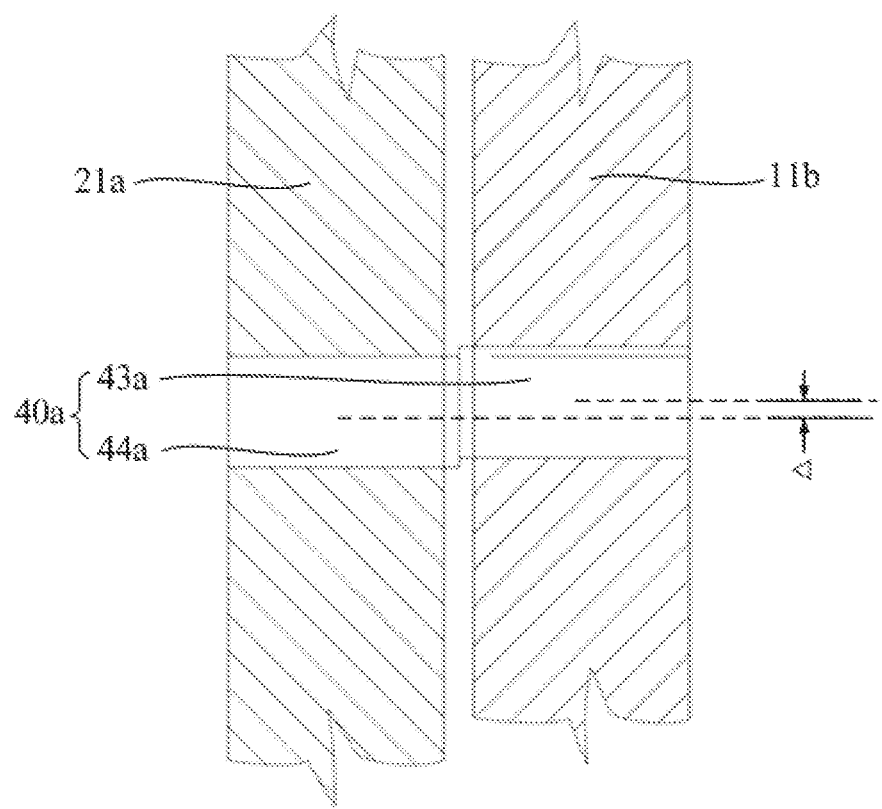
FIG. 7 schematically illustrates a partial diagram of the cycloid disk fixedly connected in a circumferential direction in the pin tooth cycloid reducer shown in FIG. 5.

Referring to FIG. 7, it schematically illustrates a partial structure diagram of the first cycloid disk and the third cycloid disk connected by the first connector in this embodiment. The first connector 40a includes a first connecting section 43a and a second connecting section 44a. The first connecting section 43a is fixedly connected to the second cycloid disk 11b, and the second connecting section 44a is fixedly connected to the third cycloid disk 21a. The first connecting section 43a and the second connecting section 44a are not on the same line. In this way, there is a dislocation distance Δ between the first connecting section 43a and the second connecting section 44a. Therefore, there is an angular difference between the second cycloid disk 11b and the third cycloid disk 21a in the circumferential direction. In this way, the teeth of the second cycloid disk 11b and the teeth of the third cycloid disk 21a are not completely aligned in the axial direction, and have the angular difference in the circumferential direction.

Since the first cycloid structure 10a and the second cycloid structure 10b share the same pin tooth housing, if the first cycloid disk 11a and the fourth cycloid disk 21b have no angular difference in the circumferential direction, or the angular difference of the cycloid disk 11a and the fourth cycloid disk 21b in the circumferential direction is not the same as the angular difference between the second cycloid disk 11b and the third cycloid disk 21a in the circumferential direction, an angle difference occurs between the third cycloid disk 21a and the fourth cycloid disk 21b.

Since the third cycloid structure 20a and the fourth cycloid structure 20b share the same pin tooth housing, the angular difference between the third cycloid disk 21a and the fourth cycloid disk 21b enables the third cycloid disk 21a and the fourth cycloid disk 21b are more tightly engaged with the pin tooth housing. On the contrary, the third cycloid disk 21a and the fourth cycloid disk 21b act on the second cycloid disk 11b and the first cycloid disk 11a via the connector, so that there is an angular difference between the first cycloid disk 11a and the second cycloid disk 11b, so that the first cycloid disk 11a and the second cycloid disk 11b are tightly engaged with the pin tooth housing.

In the manufacturing process of the cycloid structure, engaging positions of pin teeth inevitably produce a gap.

With above arrangement, it can make up the gap at engaging positions of pin teeth. At the same time, it can also make up the gap caused by the wear at the engaging position of pin teeth, so that the cycloid disk, pin teeth are tightly engaged with the pin tooth housing.

Similarly, it can also be designed that the second connector 40b includes two connecting sections, and the two connecting sections are not on the same line, so that the first cycloid disk 11a and the fourth cycloid disk 21b respectively connecting the two connecting sections have an angular difference in the circumferential direction. Alternatively, while the first connector 40a includes two connecting sections that are not on the same line, the second connector 40b includes two connecting sections that are not on the same line, so that the second cycloid disk 11b and the third cycloid disk 21a has an angular difference in the circumferential direction; the first cycloid disk 11a and the fourth cycloid disk 21b have an angular difference in the circumferential direction.

It should be noted that, in some embodiment, the eccentric shaft 30 has two eccentric portions. The first cycloid structure system I includes two cycloid structures, and the second cycloid structure system II includes two cycloid structures. In some embodiment, the eccentric shaft 30 may also have more eccentric portions with the same or opposite eccentric directions. The first cycloid structure system i may include a plurality of cycloid structures, and number of the cycloid structures are equal to the number of eccentric portions. The second cycloid structure system II may include a plurality of cycloid structures, and the number of the cycloid structures is equal to the number of eccentric portions.

For the arrangement of eccentric portions, reference may be made to the present embodiment, so that the eccentric portion includes two eccentric blocks, and the two eccentric blocks are respectively disposed on both sides of the other eccentric portion in the axial direction. One cycloid structure in the first cycloid structure system I is disposed on one of the eccentric blocks, and one cycloid structure in the second cycloid structure system II is disposed on the other of the eccentric blocks. In other words, in the first cycloid coil structure system I and the second cycloid structure system II, two cycloid disks with the shortest distance in the axial direction are fixed circumferentially, and the remaining cycloid disks are fixed successively in the circumferential direction.

In some embodiment, in eccentric portions, the number of eccentric portions having the same eccentric direction is equal to the number of eccentric portions having the opposite eccentric direction described above. That is, when the number of eccentric portions is an even number, the half eccentric portions face to the first direction, and the other half of eccentric portions face to the second direction, and the first direction and the first direction are opposite to the second direction. With this arrangement, the dynamic balance of the pin tooth cycloid reducer 100 can be relatively improved, and the vibration of the pin tooth cycloid reducer 100 can be effectively reduced.

When the first cycloid structure system I includes a plurality of cycloid structures, in the first cycloid structure system I, all pin tooth housings can be fixedly connected, or all cycloid structures can share the same pin tooth housing. When the second cycloid structure system II includes a plurality of cycloid structures, in the second cycloid structure system II, all pin tooth housings can be fixedly connected, or all the cycloid structures can share the same pin tooth housing.

In addition, in some embodiment, the first eccentric portion 31 and the second eccentric portion 32 may also be disposed as follows: the first eccentric portion 31 includes and the second eccentric portion 32 include two eccentric blocks respectively, and the two eccentric blocks of the first eccentric portion 31 and the two eccentric blocks of the second eccentric portion 32 are alternately disposed in the axial direction.

The first eccentric portion 31 and the second eccentric portion 32 may also have the same eccentric phase, that is, the first eccentric portion 31 and the second eccentric portion 32 face to a same direction. If the first eccentric portion 31 and the second eccentric portion 32 have a same eccentricity, which can be regarded as the first cycloid disk 11a, the second cycloid disk 11b, the third cycloid disk 21a, and the fourth cycloid disk 21b are sleeved on the same eccentric portion. In this way, the first cycloid disk 11a, the second cycloid disk 11b, the third cycloid disk 21a, and the fourth cycloid disk 21b can be fixedly connected in the circumferential direction.

If the first eccentric portion 31 and the second eccentric portion 32 have different eccentricities, the first cycloid disk 11a, the second cycloid disk 11b, the third cycloid disk 21a, and the fourth cycloid disk 21b can be designed in a different manner. Reference is made to the case where the eccentric directions are opposite.

Referring to FIG. 5 and FIG. 6, in some embodiment, a first bearing 51 is disposed between the first cycloid disk 11a and the first eccentric block 32a, and a second bearing 52 is disposed between the second cycloid disk 11b and the first eccentric portion 31, and a third bearing 53 is disposed between the third cycloid disk 21a and the first eccentric portion 31, and a fourth bearing 54 is disposed between the fourth cycloid disk 21b and the second eccentric block 32b. The first bearing 51, the second bearing 52, the third bearing 53, and the fourth bearing 54 are not provided with inner rings and outer rings, so that the first cycloid structure system I and the second cycloid structure system II may have a more compact radial dimension.

In addition, a fifth bearing 55 is also disposed between pin tooth housings (ie, the third pin tooth housing 23a and the fourth pin tooth housing 23b) in the second cycloid structure system II and the eccentric shaft 30, so that pin tooth housings are rotatably sleeved on the eccentric shaft 30, and are disposed coaxially with pin tooth housings (ie, the first pin tooth housing 13a and the second pin tooth housing 13b) in the first cycloid structure system I.

In some embodiment, the pin tooth cycloid reducer 100 further includes an outer shell 60. The first cycloid structure system I, the second cycloid structure system II, and the eccentric shaft 30 are fixedly disposed in the outer shell 60, and a sixth bearing 56 is further disposed between pin tooth housings and the outer shell 60 in the second cycloid structure system II.

In order to prevent the lubricating oil in the pin tooth cycloid reducer 100 from leaking to the outside, or to prevent foreign matter from entering the inside of the pin tooth cycloid reducer 100, an oil seal 61 is disposed between pin tooth housings and the outer shell 60 in the second cycloid structure system II.

The pin tooth cycloid reducer 100 further includes a cover plate 62. By a screw 63, radially outer edges of the first pin tooth housing in the first cycloid structure system I are axially fixed between the outer shell 60 and the cover plate 62. The cover plate 62 has a central hole, and the eccentric shaft 30 passes through the central hole. A seventh bearing 57 is also disposed between the cover plate 62 and the eccentric shaft 30.

In some embodiment, the first cycloid structure 10a and the second cycloid structure 10b also share the plurality of first pin teeth 12, and the plurality of first pin teeth 12 are fixedly disposed in the pin tooth notch of the pin tooth housing in the first cycloid structure system I. The third cycloid structure 20a and the fourth cycloid structure 20b also share the plurality of second pin teeth 22, and the plurality of second pin teeth 22 are fixedly disposed in the pin tooth notch of the pin tooth housing in the second cycloid structure system II.

In addition, the pin tooth cycloid reducer 100 further includes a limiter 25, and the limiter 25 is an annular isolation plate sleeved on the eccentric shaft 30. The annular isolation plate is fixedly disposed in one axial end of the plurality of second pin teeth 22 by a screw 26, to prevent the second pin 22 from sliding out of the pin tooth notch in the axial direction.

Although the present disclosure has been disclosed above with reference to preferred embodiments thereof, it should be understood that the disclosure is presented by way of example only, and not limitation. Those skilled in the art can modify and vary the embodiments without departing from the scope of the present disclosure.

What is claimed is:

1. A pin tooth cycloid reducer, comprising:
   a first cycloid structure system and a second cycloid structure system, disposed in an axial direction, wherein the first cycloid structure system is sleeved on an eccentric shaft, and each cycloid structure system comprises at least one cycloid structure in the axial direction;
   wherein the cycloid structure comprises: a cycloid disk, a plurality of pin teeth distributed circumferentially and a pin tooth housing, successively disposed from inside to outside in a radial direction; wherein the plurality of pin teeth are rotatably fixed to the pin tooth housing, and the cycloid disk engages with the plurality of pin teeth;
   wherein all pin tooth housings in the pin tooth cycloid reducer are coaxially disposed;
   wherein at least one cycloid disk in the second cycloid structure system and at least one cycloid disk in the first cycloid structure system are circumferentially fixed, and circumferentially fixed cycloid disks are coaxially disposed;
   wherein when the eccentric shaft rotates, the cycloid disk in the first cycloid structure system rotates at a first angle $\alpha$ relative to the corresponding pin tooth housing, and the cycloid disk in the second cycloid structure system rotates at a second angle $\beta$ relative to the corresponding pin tooth housing, where the first angle $\alpha$ does not equal to the second angle $\beta$.

2. The pin tooth cycloid reducer according to claim 1, wherein the second cycloid structure system is sleeved on the eccentric shaft.

3. The pin tooth cycloid reducer according to claim 1, wherein in the first cycloid structure system, there is disposed one cycloid structure; and in the second cycloid structure system, there is disposed one cycloid structure.

4. The pin tooth cycloid reducer according to claim 1, wherein both the first cycloid structure system and the second cycloid structure system comprise at least two cycloid structures disposed in sequence in the axial direction; and a number of the at least one cycloid disk in the first cycloid structure system and a number of the at least one cycloid disk in the second cycloid structure system are equal, and the at least one cycloid disk in the first cycloid structure system and the at least one cycloid disk in the second cycloid structure system are fixedly connected in a one-to-one correspondence in a circumferential direction.

5. The pin tooth cycloid reducer according to claim 4, wherein in the first cycloid structure system and the second cycloid structure system, two cycloid disks having the shortest distance therebetween in the axial direction are fixed circumferentially, and the other cycloid disks are circumferentially fixed.

6. The pin tooth cycloid reducer according to claim 1, wherein the eccentric shaft has a plurality of eccentric portions, and eccentric phases of any two eccentric portions are the same or opposite.

7. The pin tooth cycloid reducer according to claim 6, a number of the plurality of eccentric portions is even, wherein half of the plurality of eccentric portions collectively face to a first direction and the other half of eccentric portions face to a second direction, and the first direction and the second direction face are opposite.

8. The pin tooth cycloid reducer according to claim 1, further comprising: at least one connector, to achieve a circumferential fixed connection of the cycloid disk.

9. The pin tooth cycloid reducer according to claim 8, wherein a number of the at least one connector is plural, and the connectors are uniformly distributed in the circumferential direction.

10. The pin tooth cycloid reducer according to claim 8, wherein the connector is selected from a group consisting of a pin, a bolt, and a screw.

11. The pin tooth cycloid reducer according to claim 1, wherein the cycloid disk fixed circumferentially is an integral structure.

12. The pin tooth cycloid reducer according to claim 8, wherein the connector comprises a first connecting section and a second connecting section disposed in sequence in the axial direction, wherein the first connecting section connects to the cycloid disk in the first cycloid structure system, and the second connecting section connects to the cycloid disk in the second cycloid structure system; and
   the first connecting section and the second connecting section are not disposed on a same line, so that cycloid disks fixed circumferentially have an angular difference in the circumferential direction.

13. The pin tooth cycloid reducer according to claim 1, wherein in at least one cycloid structures in the reducer, a pin tooth notch is disposed on an inner circumferential surface of the pin tooth housing, and the plurality of pin teeth are disposed in the pin tooth notch.

14. The pin tooth cycloid reducer according to claim 13, further comprising: a limiter, wherein the limiter is configured to axially limit the plurality of pin teeth in the pin tooth notch.

15. The pin tooth cycloid reducer according to claim 14, wherein the limiter comprises an annular isolation plate sleeved on the eccentric shaft, and the annular isolation plate is fixedly disposed at one axial end of the pin tooth notch.

16. The pin tooth cycloid reducer according to claim 1, wherein in at least one cycloid structure in the reducer, in the axial direction, the plurality of pin teeth are configured in at least two columns and pin teeth in a same column are distributed circumferentially.

17. The pin tooth cycloid reducer according to claim 1, wherein in the first cycloid structure system, a number of teeth of the cycloid disk is between 10-55, and a number of teeth of the pin tooth housing is between 10-55;

and/or, in the second cycloid structure system, a number of teeth of the cycloid disk is between 10-55, and a number of teeth of the pin tooth housing is between 10-55.

18. The pin tooth cycloid reducer according to claim 1, wherein in the at least one cycloid structure in the reducer, the cycloid disk and the pin tooth housing are disposed in a one-to-one correspondence; or, in the at least one cycloid structure in the reducer, one cycloid disk corresponds to at least two pin tooth housings; or, at least two adjacent cycloid structures in the first cycloid structure system share a same pin tooth housing; or, at least two adjacent cycloid structures in the second cycloid structure system share a same pin tooth housing.

19. The pin tooth cycloid reducer according to claim 1, wherein in the first cycloid structure system, all pin tooth housings are fixedly connected, or the at least one cycloid structure in the first cycloid structure system shares a same pin tooth housing.

20. The pin tooth cycloid reducer according to claim 1, wherein in the second cycloid structure system, all pin tooth housings are fixedly connected, or the at least one cycloid structure in the second cycloid structure system shares a same pin tooth housing.

21. The pin tooth cycloid reducer according to claim 1, wherein in the first cycloid structure system, at least one cycloid disk is connected to the eccentric shaft via a bearing.

22. The pin tooth cycloid reducer according to claim 1, wherein in the second cycloid structure system, at least one cycloid disk is connected to the eccentric shaft through a bearing; and/or, at least one pin tooth housing is connected to the eccentric shaft via a bearing.

23. The pin tooth cycloid reducer according to claim 21, wherein the bearing comprises a cage and a plurality of rollers disposed in the cage, and the plurality of rollers are in contact with the eccentric shaft and the cycloid disk.

24. The pin tooth cycloid reducer according to claim 1, further comprising: an outer shell, wherein the pin tooth housing in the first cycloid structure system is fixedly disposed on the outer shell.

25. The pin tooth cycloid reducer according to claim 24, wherein in the second cycloid structure system, at least one pin tooth housing is connected to the outer shell via the bearing.

26. The pin tooth cycloid reducer according to claim 25, further comprising: an oil seal, wherein the oil seal is disposed between the pin tooth housing and the outer shell, which are connected by a bearing.

27. The pin tooth cycloid reducer according to claim 24, further comprising: a cover plate, wherein the cover plate, the pin tooth housing in the first cycloid structure system and the outer shell and are successively disposed in the axial direction;

wherein the pin tooth housing in the first cycloid structure system is axially fixed between the outer shell and the cover plate, wherein the cover plate is connected to the eccentric shaft via the bearing.

28. An industrial robot, comprising: a power source and an actuator, and further comprising: the pin tooth cycloid reducer according to claim 1, wherein the pin tooth cycloid reducer, configured to reduce a rotation speed of the power source and output the reduced speed to the actuator, is fixed disposed between the power source and the actuator.

29. The pin tooth cycloid reducer according to claim 22, wherein the bearing comprises a cage and a plurality of rollers disposed in the cage, and the plurality of rollers are in contact with the eccentric shaft and the cycloid disk.

* * * * *